United States Patent Office 2,763,853
Patented Sept. 18, 1956

2,763,853

SUPERVISED APPARATUS FOR DETECTING THE PRESENCE OF SUSPENDED MATTERS IN FLUIDS

Harry C. Grant, Jr., Ridgewood, N. J., assignor to Specialties Development Corporation, Belleville, N. J., a corporation of New Jersey Application May 13, 1954, Serial No. 429,432

17 Claims. (Cl. 340—237)

The present invention relate to apparatus of the light responsive type for detecting and indicating the presence of suspended matter in a fluid, and, more particularly, to improvements for supervising such apparatus to determine if the apparatus is in proper working order and to make adjustments for maintaining the apparatus in proper working order.

The present invention can be embodied in smoke detectors of the reflection and obscuration type, but, for the purpose of illustration, the present invention will be described in connection with a smoke detector of the balanced-photoelectric-cell-obscuration type.

In smoke detectors of the foregoing character, it has been customary to detect smoke in air by directing beams of light from a common light source on each of a pair of photoelectric elements connected to oppose each other and balance out the flow of current through an electro-responsive device, passing through one of the beams a stream of air in which smoke is to be detected, and utilizing a change in the output of the cell associated with this beam (due to the presence of smoke particles in the air stream) to effect operation of the electro-responsive device and thereby give an indication and/or cause other devices to be actuated.

Since dust or other foreign matter can infiltrate the optical system to vary the intensity of the light beam through which the air stream is passed or to otherwise interfere with the normal functioning of the apparatus, it is necessary that the apparatus be cleaned periodically. However, experience has shown that it is not safe to rely on the personnel in charge of observing or attending the apparatus to clean the same when necessary. Also, the apparatus may slowly depart from its initial adjustment due to other causes, for example, aging of the optical system and the electrical components.

Accordingly, an object of the present invention is to provide supervised smoke detecting apparatus which is adapted for automatic operation and hence is not subject to the foregoing disadvantages.

Another object is to provide such apparatus which is periodically tested to determine whether its original smoke detecting sensitivity has materially changed.

Another object is to provide such apparatus wherein, if such change has been due to the collection of dust or the like in the optical system, adjustment is made automatically to restore the appartus to its original sensitivity.

Another object is to provide such apparatus which includes elements for automatic inspection of its ability to respond to smoke, to detect any dirting effect, and, if dirting exists, to compensate for it.

Another object is to periodically test, automatically, the overall ability of all of the many individual, but associated, elements to function together, when subjected to a disturbance exactly equivalent to smoke of predetermined density, to cause a smoke alarm, omitting only the final alarm signals, and to cause a trouble signal if any of the several elements fails to function.

Another object is to prevent false alarms due to failure to keep the optical system clean to the extent that the accumulative dirting effect is equivalent to a smoke density which should normally operate alarm signals.

Another object is to prevent gradual increase in sensitivity as dirt accumulates so that a momentary disturbance, as a light cloud of dust in the air stream, will not cause a false alarm.

A further object is to provide such apparatus which is simple and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing apparatus including as a feature thereof means under the control of an element responsive to the output of a photoelectric cell for gradually increasing the effective output of the photoelectric cell in small increments to compensate for slight decreases in the effectiveness or intensity of the light beam due to dirting or decrease in output of the cell due to aging and including means for changing at will the output of the cell in an amount less than an increment of increase in output effected by the first mentioned means. In other words, the apparatus originally is adjusted at the desired sensitivity which must be less than maximum possible sensitivity, the sensitivity is tested from time to time to detect slight decreases in sensitivity due to dirting or other causes, and whenever appreciable dirting is detected, adjustment is made to compensate for the decrease in apparent sensitivity.

Another feature of the apparatus resides in the provision of means for changing at will the effective output of the cell in an amount to simulate the condition of smoke in the fluid stream, for example, a condition in simulating the minimum percentage of smoke in air sought to be detected, and causing a signal to be given in the event the apparatus fails to respond to such condition.

Still another feature of the apparatus resides in the provision of means for changing at will the output of the cell in an amount which together with any change in the cell output due to dirting will simulate a condition in the apparatus capable of causing false operation.

Further features of the apparatus include the provision of means for rendering an alarm, which is normally responsive to a smoke signal, ineffective during testing of the apparatus; a trouble signal for indicating that the apparatus has been adjusted to its maximum possible sensitivity due to dirting wherefor cleaning of the apparatus is necessary or a trouble signal for indicating that dirting of the apparatus has progressed to a condition about to give false operation.

In the illustrative embodiment about to be described, testing and adjustment of the sensitivity of the apparatus is accomplished by the insertion of elements between the light beam through which the air stream passes and the photoelectric cell to thereby optically test and adjust the sensitivity of the apparatus, as will be made apparent hereinafter.

A preferred embodiment of the invention has been chosen for purposes of illustration and description, and is shown in the accompanying drawings, forming a part of the specification, wherein.

Figure 1:
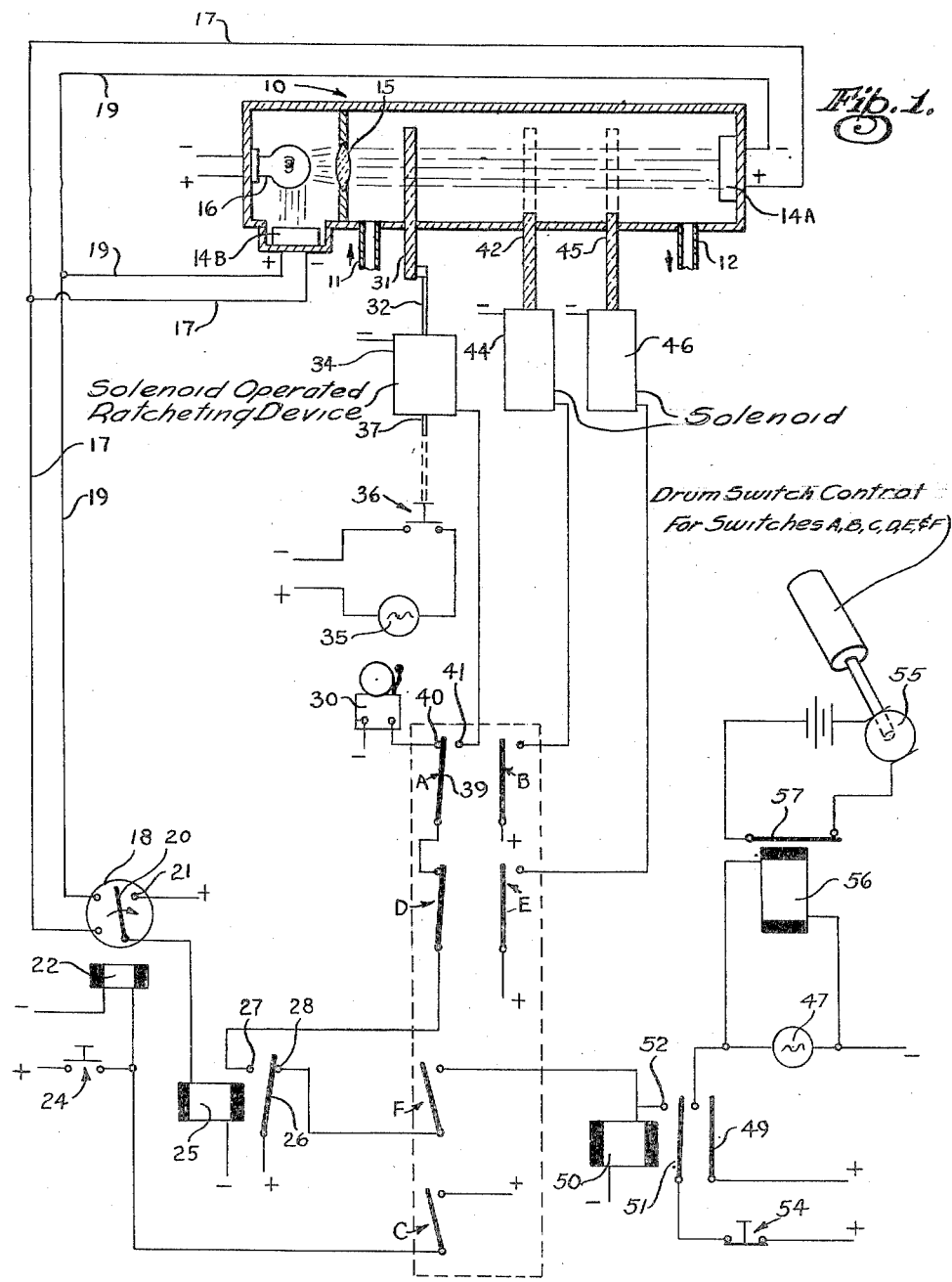
Fig. 1 is a schematic view of a smoke detector in accordance with the invention, including a simplified wiring diagram utilized in connection therewith.

Referring to Fig. 1 of the drawings in detail, there is shown a smoke analyzing tube 10 having an inlet 11 and an outlet 12 for circulating air therethrough in which smoke is to be detected, a photoelectric element or cell 14A at one end of the tube, a lens 15 at the opposite end of the tube, and a lamp 16 positioned to direct a light beam through the lens 15 onto the photoelectric element 14A and to direct a light beam onto a second photoelectric element 14B serving as the balancing cell.

The photoelectric elements may be barrier-layer type cells adapted to generate electrical current of a value in proportion to the intensity of the light beam directed thereon. In a balanced or opposed cell type circuit, as shown herein, the positive terminal of the cell 14A and the negative terminal of the cell 14B are connected by wires 17 to one terminal of a galvanometer or relay 18, and the negative terminal of the cell 14A and the positive terminal of the cell 14B are connected by wires 19 to the other terminal of the relay. Suitable resistance means (not shown) may be connected in this circuit for accurately balancing the output of the cells whereby current normally will not flow through the relay.

The relay 18 may be of the magnetic contact type, and comprises a movable contact element 20 and a fixed contact element or terminal 21 which, upon engagement, are held together by magnetic force until they are separated physically by a solenoid 22 contained within the relay. Normally, when the output currents generated by the cells are equal, the contact element 20 is out of contact with the element 21, as shown. Should the intensity of the light beam directed on the cell 14A be diminished due to smoke in the air stream, for example, the output of this cell is reduced to a value whereby sufficient current flows from the cell 14B through the relay to cause the contact elements 20 and 21 to engage. A manually operable push button switch 24 or the like usually is provided for energizing the solenoid 22 to release the relay contacts after a smoke signal has caused them to engage. A second switch C connected in parallel with the switch 24 is provided for a similar purpose described hereinafter.

Ordinarily, the contacts of the relay 18 do not have a sufficient capacity to carry the current required to operate various forms of alarm circuits, and, for this reason, it is customary to have this relay act as a control switch for an auxiliary relay 25 equipped with contacts of sufficient size to carry the alarm circuit current. The relay 25, as shown and for the purpose made apparent hereinafter, is of the single pole double throw type which comprises a contact arm 26 and contact terminals 27 and 28 adapted to be engaged by the arm when this relay is energized and de-energized, respectively.

An alarm, such as a bell 30 or the like, is connected in a circuit under the control of the contact elements 26 and 27, which circuit also includes switches A and D.

As previously indicated herein, an element such as an opaque rod 31 of relatively small diameter extends into the tube 10 between the lamp and the cell 14A. This rod is initially inserted to extend completely across the light beam when the optical system is clean and slightly reduces the maximum intensity of the beam. The rod is then withdrawn from the tube gradually in small fixed increments as the dirting of the optical system reduces the intensity of the beam whereby the rod becomes less effective to reduce the intensity of the light beam and more light passes the rod to compensate for the dirting effect.

As shown herein, the rod 31 is mechanically connected by a link 32 to a solenoid operated ratcheting device 34, so that each time this device is energized and de-energized, the rod is withdrawn from the tube 10 a small predetermined distance. In the event considerable dirt has infiltrated the optical system and the rod has reached the limit of its adjusting range, it is desirable to give an indication of this condition. This may be accomplished by providing a trouble signal such as a lamp 35 connected in a circuit under the control of a switch 36 adapted to be closed by an element 37 of device 34 which is moved into its switch closing position (as shown in broken lines) when the rod 31 has been fully withdrawn.

As will be noted, the switch A is of the single pole double throw type comprising a movable arm 39 for alternately engaging contacts 40 and 41 which respectively control the circuits in which the alarm 30 and the device 34 are connected.

In order to determine whether or not the rod 31 should be withdrawn one step to compensate for an increase in dirting effect and the consequent reduction in the effective intensity of the beam which controls the effective output of the cell 14A, a second rod 42 is provided which is inserted into the light beam momentarily at desired intervals. This rod serves as a means for intermittently reducing the output of the cell 14A in an amount less than an increment of increase in output is effected by withdrawing the rod 31 on step. To accomplish this, the rod 42 blocks but a very small amount of light, which reduction in light intensity, if the optical system is clean, in itself would not sufficiently reduce the output of the cell 14A to unbalance the cell circuit and cause a smoke signal to be given. However, a reduction in the intensity of the light beam, which is the sum of a more than desirable dirting effect and the light blocking effect of the rod 42, will sufficiently reduce the output of the cell 14A to cause a smoke signal. As shown, the rod 42 may be inserted and retracted by means of a solenoid 44 connected in a circuit under the control of a switch B.

The apparatus is further provided with a third rod 45 adapted to be momentarily inserted into the light beam directed on the cell 14A to determine whether or not the apparatus is in working order to give a smoke signal by causing the contact arm 20 of the relay 18 to deflect and cause energization of the relay 25. This rod blocks sufficient light to simulate a smoke condition in the tube 10, and, as noted, is inserted and retracted by means of a solenoid 46 connected in a circuit under the control of a switch E.

In the event the relays 18 and 25 are not energized upon insertion of the rod 45, it is desirable to indicate that such condition exists, for example, by means of a trouble signal such as a lamp 47. This lamp is connected in a circuit under the control of one arm 49 of a single throw double pole type relay 50 which is connected in a circuit under the control of the relay contact arm 26 and contact terminal 28 and a switch F. The relay 50 is arranged for self-energization so that it will retain when once energized, through a sub-circuit including the other arm 51 of the relay 50, a contact 52 and a manually operable, normally closed switch 54 adapted to be opened to release the relay 50 after an attendant has become aware of the trouble indication.

The apparatus disclosed herein is adapted to be tested periodically for dirting of the optical system and ability to respond to a smoke signal and is adapted to be operated to compensate for dirting in the manner about to be described. Normally, when the apparatus is functioning, the various switches, relays and rods are in the positions illustrated. In order to test and compensate for dirting, the switch A is moved from left to right to open the alarm circuit and close the solenoid operated device circuit by causing contacts 39 and 40 to disengage and causing contacts 39 and 41 to engage, and the switch B is closed to operate the solenoid 44 whereby the rod 42 is inserted into the light beam. In the event a more than permissible or desirable reduction of the light beam intensity has been effected by the accumulation of dirt, the additional reduction of the beam intensity effected by the rod 42 results in the simulation of a smoke signal whereupon the relay contacts 20 and 21 engage and are magnetically retained and the relay 25 is energized to cause contacts 26 and 27 to engage to complete the solenoid device circuit through switches A and D. The device 34 is then operated to retract the rod 31 one step to compensate for dirting of the optical system. Immediately thereafter, the switches A and B are returned to their initial positions, and the switch C or the switch 24 is operated to reset the relay 18.

In the event the opetical system is clean, the insertion of the rod 42 into the beam does not cause a smoke signal to be simulated and resultant compensating operation of the rod 31.

In order to test for the ability of the apparatus to respond to smoke, the switch D is opened to disconnect the alarm 30 and the switch E is closed to energize the solenoid 46 and insert the rod 45 into the beam. When the apparatus is functioning properly, the cell circuit is unbalanced to cause relay contacts 20 and 21 to engage and cause the relay 25 to be energized whereby its contacts 26 and 27 are engaged and its contacts 26 and 28 are disengaged.

The switch F is also closed (after the switch E has been closed for a duration to enable the relay 25 to respond) to close the trouble lamp relay circuit. In the event the relay 25 is energized as it will if the apparatus responds to a smoke condition, this last mentioned circuit will be open by reason of the contacts 26 and 28 being disengaged and nothing happens. However, should the relay 25 fail to be energized and the contacts 26 and 28 are in engagement, the relay 50 will be energized to effect closing of the switch 49, operation of the trouble lamp 47, and self-energization through contact elements 51 and 52 to maintain the trouble lamp in operation until noticed by an attendant.

Thereafter, the switches E and F are opened; the switch C or the switch 24 is closed momentarily to reset the relay 18, if it has responded, or, alternatively, the switch 54 is opened momentarily to reset the relay 50, if it has been energized; and, finally the switch D is closed.

While the switches A, B, C, D, E and F are illustrated as being of the manually operable type, it will be understood that these switches may all be embodied in a drum type switch or control to provide for the sequence of operations or steps illustrated in the following table:

| Steps | Switches | | | | | |
|---|---|---|---|---|---|---|
| | A | B | C | D | E | F |
| 1 | Left | Open | Open | Closed | Open | Open. |
| 2 | Right | Closed | do | do | do | Do. |
| 3 | Left | Open | do | do | do | Do. |
| 4 | do | do | Closed | do | do | Do. |
| 5 | do | do | Open | do | do | Do. |
| 6 | do | do | do | Open | Closed | Do. |
| 7 | do | do | do | do | do | Closed. |
| 8 | do | do | Closed | Closed | Open | Open. |
| 1 | do | do | Open | do | do | Do. |

Such a drum type switch may be operated by a motor 55 through suitable gearing, and may be arranged so that this switching cycle is carried out once every two hours for example, or periodically at any other desirable interval of time. By utilizing such automatic supervision of the apparatus, certain switching steps may take place simultaneously. For example, the switches A and B may be operated together in the second and third steps, the switches D and E may be operated together in the sixth step, and the switches C, D, E, and F may be operated together in the seventh step, whereby this switching cycle is more simple than the manual switching cycle and less time is required to complete the same. For example, the entire switching cycle may be completed in ten seconds.

Since it is desirable to stop the switch drum motor 55 in the event the trouble signal 47 is operated, indicating that the apparatus is out of order, a relay 56 may be connected in parallel with the signal, which, when energized, is adapted to open a normally closed switch 57 in the motor energizing circuit. When the trouble has been corrected, this relay is de-energized to permit the switch 57 to close again upon opening of the switch 54 which de-energizes the relay 50 controlling the swtich arm 49.

While the present invention has been described in connection with a smoke detector of the balanced-cell-obscuration type, it will be appreciated that the features of the invention may be advantageously embodied in other types of smoke detectors and devices for detecting suspended matter in fluid, such as dust, air, solid particles in liquids, or turbidity or coloring matter in liquids.

For example, the present invention may be utilized in connection with apparatus of the single cell type, wherein the rod 31 further would serve to compensate for slight reduction in the cell output due to aging of the cell.

It will also be appreciated, where special conditions warrant, that the same basic apparatus may be advantageously utilized but omitting the compensating rod 31 and using only the rods 42 and 45 to periodically test whether or not the initial sensitivity setting has not changed outside the preset limits set up by the rods 42 and 45. For example, the rod 42 could be adapted to change the output of the cell in an amount which together with any change in cell output due to dirting would simulate a condition capable of giving false operation and the device 34 could be utilized to operate the switch 36 when such a condition exists. Actually, this takes place in the apparatus as shown in Fig. 1 when the element 37 is in its switch closing position. Also, the rod 45 may be used alone to test the ability of the equipment to cause an alarm in the presence of smoke exceeding a given density.

Figure 2:
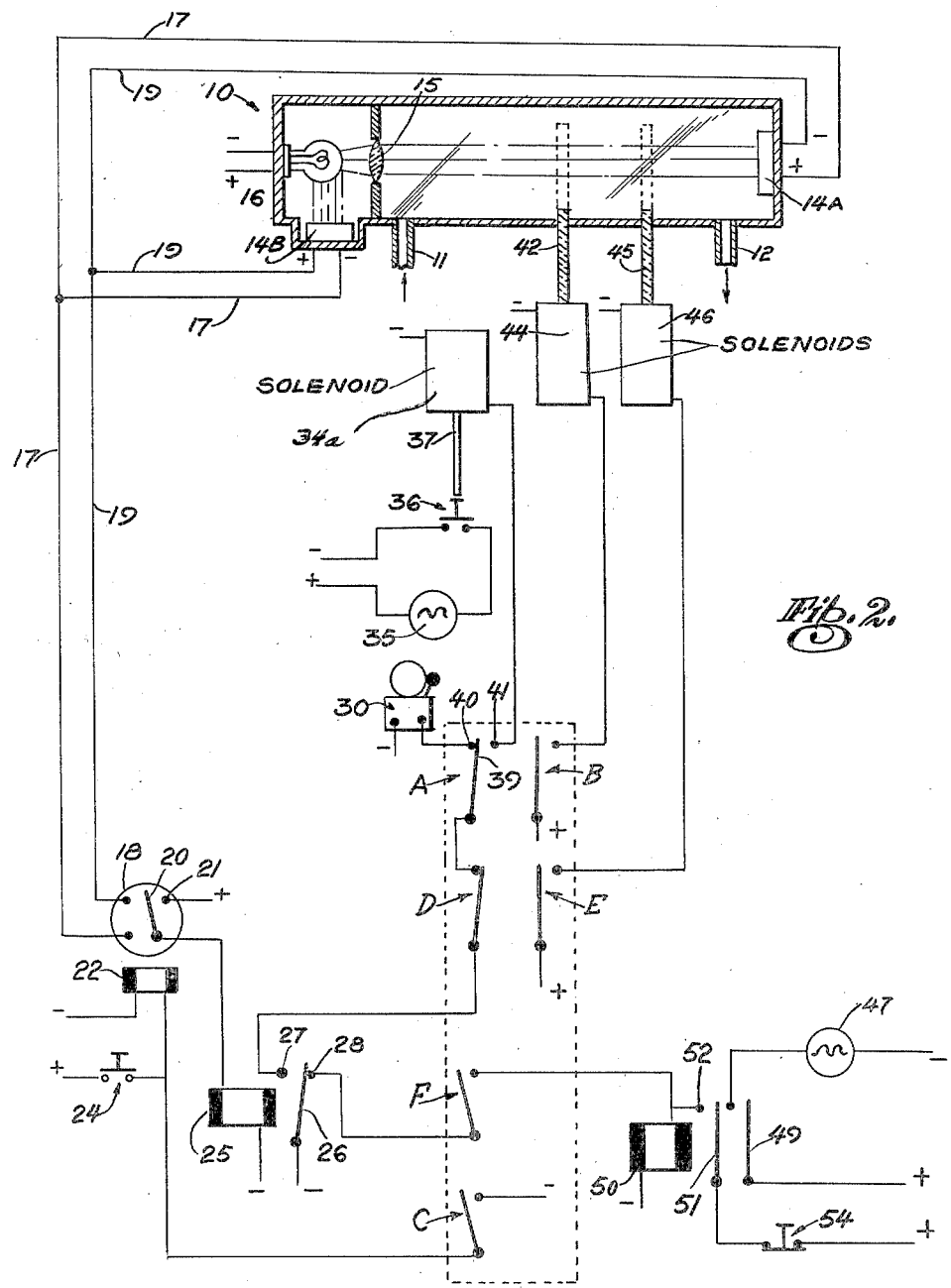
Fig. 2 is a view similar to Fig. 1, illustrating a modification of the apparatus shown in Fig. 1.

In Fig. 2, a modified form of apparatus is shown which differs slightly from that shown in Fig. 1, like elements having like reference characters applied thereto in both views.

In Fig. 2 the rod 31 has been dispensed with, as previously indicated, and the solenoid operated ratcheting device 34 is a simple solenoid 34a, a relay or the like, and the element 37 is in position to close the switch 36 upon actuation of the solenoid 34a. The rod 42, in this embodiment, is constructed to reduce the output of the cell 14A which together with a reduction in cell output due to excessive dirting would cause the relay 18 to be operated. In this manner, a condition is simulated such as would exist when dirting has progressed to a condition, whereby dirting alone would effect operation of the apparatus and a false alarm would be given. When this test is made, the switches A, B, C, D, E and F are in the positions of Step 2 of the illustrative sequence of operations table previously set forth herein, whereby the alarm is cut out and the solenoid 34a will be actuated to close the switch 36 and the trouble lamp 35 is illuminated.

The rod 45, in this embodiment, is constructed to reduce the output of the cell 14A in about the same manner air containing a selected smoke density would reduce the cell output and cause the apparatus to respond. In this manner, the sensitivity of the apparatus can be set to respond at a minimum level of smoke and can be tested from time to time for such sensitivity.

When this test is made, the switches A, B, C, D, E, and F are in the positions of Step 7, whereby the alarm is cut out and the relay 50 will be actuated to close the circuit for effecting illumination of the trouble lamp 47 in the event the relay 18 failed to respond. However, should the relay 18 respond when the rod 45 is moved into the fluid stream, the contact or switch arm 26 of the relay 25 is moved to the left (as viewed) and is out of engagement with the contact 28, whereby the circuit for the relay 50 is de-energized and the trouble lamp 47 will not be illuminated.

It will of course be understood that the automatic switching mechanism shown in Fig. 1 could be utilized in connection with the apparatus shown in Fig. 2, and that the switches could be operated manually and that the rods 42 and 45 could be operated manually directly instead of by the solenoids.

From the foregoing description, it will be seen that the present invention provides novel and useful improvements for supervising light responsive apparatus adapted to indicate the presence of suspended matter in fluids. The apparatus embodying the invention is simple and practical in construction, is reliable in operation, and readily lends itself to automatic operation.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

This application is a continuation-in-part of my co-pending application Serial No. 212,962, filed February 27, 1951, now abandoned.

I claim:

1. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element, means under the control of said responsive means for gradually increasing the output of said element in small increments to compensate for slight decreases in the effectiveness of the light beam due to the accumulation of foreign matter in the apparatus, and means for intermittently reducing the output of said element in an amount less than an increment of increase in output effected by said last mentioned means, whereby a predetermined reduction in the output of said element due to the combined effects of accumulation of foreign matter in the apparatus and of said means for intermittently reducing the output of said element is effective to cause actuation of said means responsive to the output of said element and operation of said means under the control of said responsive means.

2. In apparatus for detecting the presence of suspended matter in a fluid, the combination of a photoelectric element, means for directing a beam of light on said element, means for passing between said element and the light beam a stream of fluid in which suspended matter is to be detected, means responsive to the output of said element, obscuring means normally between said element and the light beam for reducing the output of said element, means under the control of said responsive means for gradually retracting said last mentioned means to increase the output of said element in small increments to compensate for slight decreases in the effectiveness of the light beam due to the accumulation of foreign matter in the apparatus, and means intermittently positioned between said element and the light beam for reducing the output of said element in an amount less than the increase in output effected by one movement of said obscuring means, whereby a predetermined reduction in the output of said element due to the combined effects of accumulation of foreign matter in the apparatus and of said intermittently positioned means is effective to cause actuation of said means responsive to the output of said element and operation of said means under the control of said responsive means.

3. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element including alarm means, means under the control of said responsive means for gradually increasing the output of said element in small increments to compensate for slight decreases in the effectiveness of the light beam due to the accumulation of foreign matter in the apparatus, means for intermittently reducing the output of said element in an amount less than an increment of increase in output effected by said last mentioned means, whereby a predetermined reduction in the output of said element due to the combined effects of accumulation of foreign matter in the apparatus and of said means for intermittently reducing the output of said element is effective to cause actuation of said means responsive to the output of said element and operation of said means under the control of said responsive means, and means for rendering said output reducing means effective and said alarm means ineffective.

4. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element, movable means under the control of said responsive means for gradually increasing the output of said element in small increments to compensate for slight decreases in the effectiveness of the light beam due to the accumulation of foreign matter in the apparatus, means for intermittently reducing the output of said element in an amount less than an increment of increase in output effected by said last mentioned means, whereby a predetermined reduction in the output of said element due to the combined effects of accumulation of foreign matter in the apparatus and of said means for intermittently reducing the output of said element is effective to cause actuation of said means responsive to the output of said element and operation of said means under the control of said responsive means, and means for giving an indication when said output increasing means has been moved into a predetermined position.

5. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element, means under the control of said responsive means for gradually increasing the output of said element in small increments to compensate for slight decreases in the effectiveness of the light beam due to the accumulation of foreign matter in the apparatus, means for intermittently reducing the output of said element in an amount less than an increment of increase in output effected by said last mentioned means, whereby a predetermined reduction in the output of said element due to the combined effects of accumulation of foreign matter in the apparatus and of said means for intermittently reducing the output of said element is effective to cause actuation of said means responsive to the output of said element and operation of said means under the control of said responsive means, and means for intermittently reducing the output of said element in an amount to simulate the condition of suspended matter in the fluid stream.

6. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element, mechanism operable for periodically changing the output of said element in an amount to simulate the condition of suspended matter in the fluid stream, and a trouble signal operable only when said responsive means fail to respond upon operation of said mechanism.

7. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element, mechanism operable for periodically changing the output of said element in an amount to simulate the condition of suspended matter in the fluid stream, a trouble signal operable only when said responsive means fail to respond upon operation of said mechanism, means for rendering said trouble signal effective, means for maintaining said trouble signal effective, and means for rendering said last mentioned means ineffective.

8. In apparatus for detecting the presence of suspended matter in a fluid, the combination of means for providing a stream of fluid in which suspended matter is to be detected, means for directing a beam of light through the fluid stream, a photoelectric element positioned with respect to the light beam and the fluid stream to detect a change in the condition of the fluid stream whereby its output is affected, means responsive to the output of said element including an alarm, mechanism operable for periodically changing the output of said element in an amount to simulate the condition of suspended matter in the fluid stream, a trouble signal operable only when said responsive means fail to respond upon operation of said mechanism, mechanism for simultaneously rendering said output changing mechanism effective and said alarm momentarily ineffective, and means for rendering said trouble signal effective.

9. In apparatus for detecting the presence of suspended matter in a fluid, the combination of means for providing a stream of fluid in which suspended matter is to be detected, means for directing a beam of light through the fluid stream, a photoelectric element having a predetermined output and positioned with respect to the light beam and the fluid stream to detect a change in the condition of the fluid stream whereby its output is affected, relay means responsive to a substantial change in the output of said element, means for intermittently changing the output of said element of predetermined amount less than the change in output to which said responsive means will respond, and means operable upon the change of output of said element affected by said last mentioned means in the event such change in output exceeds said predetermined amount, whereby said output is increased.

10. In apparatus for detecting the presence of suspended matter in a fluid, the combination of means for providing a stream of fluid in which suspended matter is to be detected, means for directing a beam of light through the fluid stream, a photoelectric element having a predetermined output and positioned with respect to the light beam and the fluid stream to detect a change in the condition of the fluid stream whereby its output is affected, means responsive to a substantial change in the output of said element, means for intermittently changing the output of said element a predetermined amount less than the change in output to which said responsive means will respond, means responsive to the change of output of said element affected by said last mentioned means in the event such change in output exceeds said predetermined amount, and means for intermittently changing the output of said element in an amount to simulate the condition of suspended matter in the fluid stream.

11. In apparatus for detecting the presence of suspended matter in a fluid, the combination of means for providing a stream of fluid in which suspended matter is to be detected, means for directing a beam of light through the fluid stream, a photoelectric element having a predetermined current characteristic and positioned with respect to the light beam and the fluid stream to detect a change in the condition of the fluid stream whereby its current characteristic is affected, relay means responsive to a substantial change in the current characteristic of said element, means for intermittently changing the current characteristic of said element a predetermined amount less than the change in current characteristic to which said responsive means will respond, and means operable upon the change of current characteristic of said element affected by said last mentioned means in the event such change in current characteristic exceeds said predetermined amount, whereby said current characteristic is changed.

12. In apparatus for detecting the presence of suspended matter in a fluid, the combination of means for providing a stream of fluid in which ssupended matter is to be detected, means for directing a beam of light through the fluid stream, a photoelectric element positioned with respect to the light beam and the fluid stream to detect a change in the condition of the fluid stream whereby its output is affected, means responsive to the output of said element, indicating means, means under the control of said responsive means for operating said indicating means, and means for changing at will the output of said element in an amount less than such amount which would simulate the condition of suspended matter in the fluid stream, whereby a predetermined reduction in the output of said element due to the combined effects of accumulation of foreign matter in the apparatus and of said means for changing the output of said element is effective to cause actuation of said means responsive to the output of said element and operation of said means under the control of said rseponsive means.

13. Apparatus according to claim 12, including alarm means under the control of said means responsive to the output of said element, and means for rendering said means for changing the output of said element effective and said alarm means ineffective.

14. In apparatus for detecting the presence of smoke in air, the combination of means for providing a stream of air in which smoke is to be detected, means for directing a beam of light through the stream, a photoelectric element positioned with respect to the light beam and the fluid stream to detect a change in the condition of the stream whereby its output is affected, means responsive to the output of said element, alarm means, means under the control of said responsive means for operating said alarm means, and means for changing at will the output of said element in an amount which together with any change in the output of said element due to dirting will simulate an output condition capable of causing said responsive means to respond thereto.

15. Apparatus according to claim 14, including a trouble signal, means for rendering said alarm means ineffective, and means for rendering said alarm operating means effective for operating said trouble signal.

16. In apparatus for detecting the presence of smoke in air, the combination of means for providing a stream of air in which smoke is to be detected, means for directing a beam of light through the fluid stream, a photoelectric element positioned with respect to the light beam and the fluid stream to detect a change in the condition of the fluid stream when a predetermined minimum amount of smoke is in the air whereby its output is affected, means responsive to the change in output of said element, and means for changing at will the output of said element in an amount only to simulate the condition of a predetermined minimum amount of smoke in the air.

17. In apparatus according to claim 16, including alarm means under the control of said means responsive to the output of said element, a trouble lamp, means for rendering said alarm means momentarily ineffective, means for causing said trouble lamp to be illuminated, and means for rendering said last mentioned means ineffective when said responsive means respond.

References Cited in the file of this patent

UNITED STATES PATENTS

| | | |
|---|---|---|
| 2,052,057 | Reid | Aug. 25, 1936 |
| 2,455,351 | Beam et al. | Dec. 7, 1948 |
| 2,509,497 | Hesson | May 30, 1950 |
| 2,639,418 | Sundstrom et al. | May 19, 1953 |

FOREIGN PATENTS

| | | |
|---|---|---|
| 788,111 | France | Oct. 4, 1935 |